United States Patent Office 3,032,536
Patented May 1, 1962

3,032,536
THIOCARBONYL DIFLUORIDE COPOLYMER
Robert E. Putnam and Henry C. Walter, Brandywine Hundred, Del., assignors to E. I. du Pont de Nemours and Company, Wilmington, Del., a corporation of Delaware
No Drawing. Filed July 16, 1959, Ser. No. 827,442
5 Claims. (Cl. 260—79)

This invention relates to a process for the interpolymerization of thiocarbonyl difluoride with certain thioacyl fluorides and more particularly to an improved process for the anionic interpolymerization of thiocarbonyl difluoride with thioacyl fluorides using an alkoxide of aluminum or titanium as a catalyst.

Interpolymers of thiocarbonyl difluoride with certain thioacyl fluorides are particularly useful because of the particular combination of properties that they possess. In addition to exhibiting a high degree of chemical inertness, they are soluble in certain organic solvents. This solubility permits their use as coating compositions for application to various substrates such as wood, metal and glass.

It is known that thiocarbonyl difluoride can be anionically interpolymerized with monomers, such as chlorofluorothioacetyl fluoride. A wide variety of ionic initiators have been disclosed such as dimethyl formamide, primary, secondary and tertiary amines (e.g. triethylamine, diisopropylamine and aniline), triphenylphosphine, nitrosodimethylamine, quaternary ammonium chlorides having no hydrogen on the quaternary ammonium nitrogen (e.g. tetraethyl ammonium chloride) and the like. Dimethyl formamide has been considered a particularly effective initiator. The initiators have been employed in concentrations ranging from about 0.2 to 20 percent by weight of monomer. Bulk and solution polymerizations have been carried out at temperatures ranging from about $-120°$ C. to $0°$ C.

Unfortunately, the catalysts heretofore known leave something to be desired unless the thiocarbonyl difluoride is at least 95 percent pure and contains no hydrogen chloride. This necessitates the use of rather costly purification processes for the thiocarbonyl difluoride before interpolymerization thereof with other monomers can be carried out. Even when thiocarbonyl difluoride is very pure, it has not been possible to interpolymerize it satisfactorily with certain monomers, such as chlorofluorothioacetyl fluoride, since the reaction is very slow.

It is an object of the present invention to provide an improved process for interpolymerizing thiocarbonyl difluoride with certain thioacyl fluorides. A further object is to provide a process for the anionic interpolymerization of thiocarbonyl difluoride with thioacyl fluorides when the thiocarbonyl difluoride contains small amounts of hydrogen chloride or when it has a purity of less than 95 percent. A still further object is to provide a process for the anionic interpolymerization of thiocarbonyl difluoride with thioacyl fluorides wherein an ether-soluble alkoxide of aluminum or titanium is used as the catalyst.

These and other objects of this invention are accomplished by an improvement in the process of interpolymerizing thiocarbonyl difluoride with certain thioacyl fluorides which comprises contacting the monomer mixture at a temperature of from about $-80°$ C. to $-10°$ C. in an inert solvent with from about 0.1 to 10.0 mole percent of a diethyl ether-soluble alkoxide of aluminum or titanium.

As mentioned above, interpolymers of thiocarbonyl difluoride with thioacyl fluorides are known; however, the processes which have been used heretofore for the preparation of these interpolymers leave something to be desired. By means of the process of the present invention, wherein an alkoxide of aluminum or titanium is used as the catalyst, it is possible to interpolymerize thiocarbonyl difluoride with thioacyl fluorides when the thiocarbonyl difluoride either contains a small amount of hydrogen chloride or has a purity of less than 95 percent and still obtain high molecular weight interpolymers in good yield. The interpolymers of thiocarbonyl difluoride and thioacyl fluorides, which are prepared according to the improved process of the present invention, can be shaped into a wide variety of useful objects by extrusion, pressing or molding. Thus, these interpolymers can be pressed into rubbery, flexible, self-supporting films.

In accordance with the process of the present invention the thiocarbonyl difluoride is interpolymerized with certain thioacyl fluorides by adding the catalyst to a solution of the monomers at a temperature of from about $-80°$ C. to about $-10°$ C. The reaction vessel should have a liner of glass or stainless steel. When the catalyst is added to the solution of monomers at a temperature of from about $-80°$ C. to about $-50°$ C., atmospheric pressure conditions may be employed; however, temperatures as high as $-10°$ C. may be conveniently employed when the interpolymerization is carried out at autogeneous pressure in a closed reaction vessel. The interpolymerization of thiocarbonyl difluoride with the thioacyl fluoride occurs very rapidly at these temperatures and, in general, a reaction time ranging from about 5 minutes to about 4 hours is satisfactory. After the catalyst is added to the solution of monomers, the reaction mixture is usually stirred in the conventional manner. When the interpolymerization is carried out at atmospheric pressure at temperatures about $-50°$ C., it is desirable to agitate the mixture very rapidly due to the volatility of the thiocarbonyl difluoride. After the interpolymer is formed it may be recovered by several procedures. Thus, when the interpolymer contains less than about 10 mole percent of thiocarbonyl difluoride comonomer, the interpolymer may be conveniently isolated by adding methanol to the reaction mixture. The coagulum is then washed with methanol and dried. Interpolymers having higher thiocarbonyl difluoride comonomer content may be precipitated by adding methanol to the reaction mixture and pouring the resulting emulsion into a 50:50 mixture by volume of water and concentrated hydrochloric acid. The coagulum is then washed with 3 N hydrochloric acid and water and finally dried.

The amount of catalyst employed in the interpolymerization process of the present invention should range from about 0.1 to 10.0 mole percent of total monomer content. The preferred range of catalyst is from about 3.0 to about 5.0 mole percent. The interpolymerization should be carried out in an inert solvent. Aliphatic (saturated) and aromatic hydrocarbons, chlorinated aliphatic (saturated) hydrocarbons and chlorinated aromatic hydrocarbons, acyclic (saturated) aliphatic ethers, aromatic ethers and heterocyclic (saturated) aliphatic ethers may be employed. Representative solvents include isopentane, pentane, cyclopentane, n-hexane, 2,2,4-trimethylpentane, methylcyclohexane and isooctane; toluene, m-xylene and cumene; methylene chloride, ethyl chsoride, cyclohexylchloride, n-octylchloride, chloroform and trimethylenechloride; m-dichlorobenzene, chlorobenzene and m-chlorotoluene; methyl ethyl ether, diethyl ether, isopropyl ether and di-n-amylether; anisole and phenetole; tetrahydrofuran, 1,3-dioxane and tetrahydropyran. Miscible mixtures may be employed when desired. The reaction mixtures generally contain about 20 to 30 percent monomer by weight of the solvent but higher or lower concentrations may be employed, when desired. The more concentrated mixtures, however, are less convenient to agitate. Preferred solvents include anhydrous diethyl ether, chloroform and tetrahydrofuran.

Any proportion of thioacyl fluoride can be interpolymerized with the thiocarbonyl difluoride in accordance with the process of this invention. The interpolymers obtained can have inherent viscosities as great as 1.0 (corresponding to a number-average molecular weight of about 200,000).

The thioacyl fluorides which are interpolymerized with thiocarbonyl difluoride in accordance with the process of the present invention are compounds having the formula

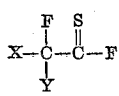

wherein X and Y are hydrogen, halogen (fluorine, chlorine, bromine or iodine), monovalent hydrocarbon or halogenated monovalent hydrocarbon radicals, and especially hydrocarbon or halogenated hydrocarbon radicals having 1 to 6 carbon atoms. Representative examples of these monomers are: chlorofluorothioacetyl fluoride, difluorothioacetyl fluoride, trifluorothioacetyl fluoride, pentafluorothiopropionyl fluoride, chlorodifluorothioacetyl fluoride, pentafluorothio-3-butenoyl fluoride, and 1,1-difluorothiopropionyl fluoride.

The thioacyl fluorides used in preparing the interpolymers can be prepared by dehydrofluorination, by means of sodium fluoride, of the mercaptans formed from the addition of hydrogen sulfide to polyfluoroolefins. They can also be prepared by sodium fluoride dehydrofluorination of the mercaptans made by reaction of polyfluoroalkyldisulfides with mercaptans such as thiophenol or octafluoropentanethiol on irradiation with ultraviolet light. Still another method for the preparation of thioacyl fluorides comprising contacting a fluoroalkyl-mercury compound of the formula $(R_fCFX)_2Hg$, where $R_f$ is a fluoroalkyl radical and X is hydrogen, chloride or fluorine with sulfur or phosphorus pentasulfide at a temperature above 400° C., preferably at a temperature at which the sulfur or phosphorus pentasulfide is molten.

The catalysts which are used in the process of the present invention are the alkoxides of aluminum or titanium which are soluble in diethyl ether. These catalysts may be represented by the structure $M(OR)_n$ wherein M is aluminum or titanium, R is an alkyl radical and n is an integer having a value equal to the valence of M. The number of carbon atoms in the alkyl radical is not critical so long as the solubility criterion is obeyed. It is preferred that the alkyl radical have no more than about eight carbon atoms.

Representative examples of the catalysts which may be used in the subject process include tetraisopropyl titanate, which is preferred, aluminum tert-butoxide, triisopropyl aluminate, tetra(2-ethyl hexyl)titanate, tetra-n-butyl titanate, tetraisobutyl titanate, tetracyclopentyl titanate, tetra-2,2-dimethylpropyl titanate and tetra-n-nonyl titanate. Mixtures of these catalysts may be employed, if desired.

The interpolymers prepared according to the process of this invention range from sticky, semi-solids to plastics, to solid elastomers, and are generally colorless when pure. Many are soluble in ethers, e.g., diethyl ether, and some particular polymers are also soluble in other organic solvents. The interpolymers are generally capable of being pressed into self-supporting films, some of which are elastomeric. The semi-solid, sticky interpolymers are useful as adhesives. Since the solid interpolymers flow at temperatures up to about 150° C., they are particularly useful for use as molding compositions. The solid interpolymers are also useful when shaped into self-supporting films, which range from opaque to transparent films, by either solvent casting or pressing. The films prepared from the solid interpolymers having elastomeric properties can be used in those applications where films and sheets having elastomeric properties are ordinarily used. Likewise, the films prepared from the plastic interpolymers can be used in those applications where plastic films and sheets are ordinarily used.

The following examples will better illustrate the nature of the present invention; however, the invention is not intended to be limited to these examples. Parts are by weight unless otherwise indicated.

EXAMPLE 1

A. Preparation of Trifluorothioacetyl Fluoride

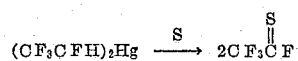

A 300-ml. three-necked flask fitted with a thermocouple, vertical glass tube 1 inch in diameter and 18 inches long to which is affixed a trap cooled by acetone-solid carbon dioxide, and means for adding solid reactants in a nitrogen atmosphere is charged with 100 g. of sulfur. The flask is flushed with nitrogen and heated. 33.0 g. of bis(1-hydroperfluoroethyl)mercury is added in increments over a period of 20 minutes to the refluxing sulfur (445° C.). There is obtained in the cold trap 7.0 ml. of crude product which on distillation yields 9.0 g. (56% of theory) of trifluorothioacetyl fluoride.

B. Interpolymerization of Trifluorothioacetyl Fluoride With Thiocarbonyl Difluoride In a polymerization vessel cooled in a solid carbon dioxide/acetone mixture and blanketed with helium are placed 7 parts of anhydrous ether, 4.5 parts of thiocarbonyl difluoride and 4.5 parts of trifluorothioacetyl fluoride. To the resulting solution is added a solution of about 0.1 part of tetraisopropyl titanate in 3.5 parts of anhydrous ether. The polymerization is run five hours at −80° C. and the reaction mixture is then poured into methanol. The interpolymer is separated by decantation, washed with methanol and dried in vacuo at 60° C. The interpolymer is dissolved in 248 parts of chloroform (0.8 part residue) and is then precipitated with 60 parts of methanol. After drying at 60° C. in vacuo it amounts to 5.1 parts. The interpolymer can be pressed to a limp, opaque film at 150° C. and 10,000 lbs. ram pressure. The interpolymer exhibits an inherent viscosity of 1.01 (measured in 0.1% chloroform solution) and does not crystallize at 28° C. Analyses show it to contain a $CF_2/CF_3CSF$ ratio of about 60:40. The ratio of monomers charged is 62:38.

*Analysis.*—Calcd. for $(CF_2S)_3(CF_3CFS)_2$: C, 16.5%; S, 31.4%; F, 52.1%. Found: C, 16.20%; S, 31.84%; F, 50.14%.

EXAMPLE 2

17.7 parts of anhydrous diethyl ether and 1.5 parts of chlorofluorothioacetyl fluoride are cooled to −80° C. in a dry agitated glass reaction flask provided with a dry nitrogen atmosphere and surrounded with a mixture of crushed solid carbon dioxide and acetone. 8.34 parts of thiocarbonyl difluoride is then distilled into the flask to give a clear solution. Over a period of 2 to 3 minutes a solution of 1.55 parts of tetraisopropyl titanate in 6 parts of diethyl ether is added to the cold agitated monomer solution. A thick slurry of white interpolymer forms which impedes the agitation. The mass is kept at −80° C. for one hour. 40 parts of methanol is then added and the temperature allowed to rise to 25° C. The cloudy liquor is decanted from the fine white slurry of precipitated interpolymer. After washes with a 40 part and three 20 part portions of methanol, the interpolymer is air dried. 5.94 parts (a 60% yield) of an almost colorless, semi-solid is obtained which exhibits an inherent viscosity (0.1% solution in chloroform at 30° C.) of 0.35 and analyzes for 4.1 percent chlorine (indicating 15 weight percent chlorofluorothioacetyl fluoride is present in the interpolymer).

EXAMPLE 3

17.7 parts of anhydrous diethyl ether is cooled to −80°

C. in a dry agitated glass reactor provided with a dry nitrogen atmosphere and chilled in a bath of crushed carbon dioxide and acetone. 5.85 parts of thiocarbonyl difluoride is distilled into the reactor. Finally 3.6 parts of chlorofluorothioacetyl fluoride is introduced. 4.98 parts of a catalyst solution (prepared by dissolving 4.2 parts of tetraisopropyl titanate in 4.25 parts of diethyl ether) is added over a 2 to 3 minute period to the agitated cold ethereal monomer mixture in 0.8 part portions. The temperature is held at −80° C. for 42 minutes longer. Then 40 parts of methanol is added and the viscous opalescent solution obtained is allowed to warm up to room temperature. The mass is poured into a mixture of 59 parts of 36 percent hydrochloric acid and 50 parts of water. The soft, sticky glob of white interpolymer which separates is collected, soaked in a mixture of 30 parts of 36 percent hydrochloric acid and 75 parts of water, leached with water, and dried in a vacuum oven at 75 to 85° C. 7.13 parts (75% yield) of a stiff plastic is obtained which exhibits an inherent viscosity (0.1% solution in chloroform at 30° C.) of 0.30 and analyzes for 13.6% chlorine content (indicating the presence of 40 weight percent chlorofluorothioacetyl fluoride in the interpolymer).

EXAMPLE 4

A catalyst solution (prepared by diluting 2.83 parts of tetraisopropyl titanate with 5.07 parts of anhydrous diethyl ether) is added in four 0.79 part-portions over a 2 to 3 minute period with stirring to a solution (made up according to the procedure of Example 3) of 9.73 parts thiocarbonyl difluoride, 0.33 part of chlorofluorothioacetyl fluoride, and 21.2 parts of anhydrous diethyl ether. Within 5 minutes the reaction mixture turns white and becomes too viscous to stir. The temperature is held at −80° C. for one hour. Then 40 parts of methanol is added. After the mixture has been allowed to warm up to room temperature, the rubbery chunks of interpolymer are collected, washed with methanol, and air dried. 7.05 parts (70% yield) of a clear, colorless, rubbery product is obtained which is capable of being pressed into a clear rubbery film at 100 to 120° C. The interpolymer analyzes for 1.1 percent chlorine (indicating 4 weight percent chlorofluorothioacetyl fluoride is present in the interpolymer). The inherent viscosity (0.1 percent solution in chloroform at 30° C.) is 0.91.

As many widely different embodiments of this invention may be made without departing from the spirit and scope thereof, it is to be understood that this invention is not limited to the specific embodiments thereof except as defined in the appended claims.

What is claimed is:

1. In the process of interpolymerizing thiocarbonyl difluoride with a thioacyl fluoride having the formula

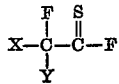

wherein X and Y are selected from the group consisting of hydrogen, halogen, monovalent hydrocarbon radicals of from 1 to 6 carbon atoms and halogenated hydrocarbon radicals of from 1 to 6 carbon atoms, the improvement comprising contacting a monomer mixture of said fluorides at a temperature of from about −80° C. to −10° C. in an inert solvent, which is liquid during the polymerization reaction, with from about 0.1 to 10.0 mole percent, based on the thiocarbonyl difluoride and thioacyl fluoride, of an alkoxide having the formula $M(OR)_n$ wherein M is selected from the group consisting of trivalent aluminum and tetravalent titanium, $n$ is an integer having a value equal to the valence of M, and R is an alkyl radical, said alkoxide being soluble in diethyl ether.

2. The process of claim 1 wherein the thioacyl fluoride is chlorofluorothioacetyl fluoride.

3. The process of claim 2 wherein the alkoxide is tetraisopropyl titanate.

4. In the process of interpolymerizing thiocarbonyl difluoride with a thioacyl fluoride having the formula

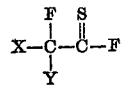

wherein X and Y are selected from the group consisting of hydrogen, halogen, monovalent hydrocarbon radicals of from 1 to 6 carbon atoms and halogenated hydrocarbon radicals of from 1 to 6 carbon atoms, the improvement comprising contacting a monomer mixture of said fluorides at a temperature of from about −80° C. to −10° C. in an inert solvent, which is liquid during the polymerization reaction, selected from the group consisting of aliphatic saturated hydrocarbons, aromatic hydrocarbons, chlorinated aliphatic saturated hydrocarbons, chlorinated aromatic hydrocarbons, acyclic saturated aliphatic ethers, aromatic ethers and heterocyclic saturated aliphatic ethers with from about 0.1 to 10.0 mole percent, based on the thiocarbonyl difluoride and thioacyl fluoride, of an alkoxide having the formula $M(OR)_n$ wherein M is selected from the group consisting of trivalent aluminum and tetravalent titanium, $n$ is an integer having a value equal to the valence of M, and R is an alkyl radical of up to 9 carbon atoms.

5. A process according to claim 4 wherein the inert solvent is selected from the group consisting of diethyl ether, chloroform and tetrahydrofuran.

References Cited in the file of this patent

"Perfluoroalkyl Derivatives of Sulfur," J.C.S., 1955, pp. 3871–3880.

"Comp't Rend." 237, 900–902 (1952), abstracted in C.A., vol 48, p. 3178b, 1954.